J. T. JONES.
SHAFT ATTACHMENT.
APPLICATION FILED OCT. 12, 1912.
1,078,731.
Patented Nov. 18, 1913.
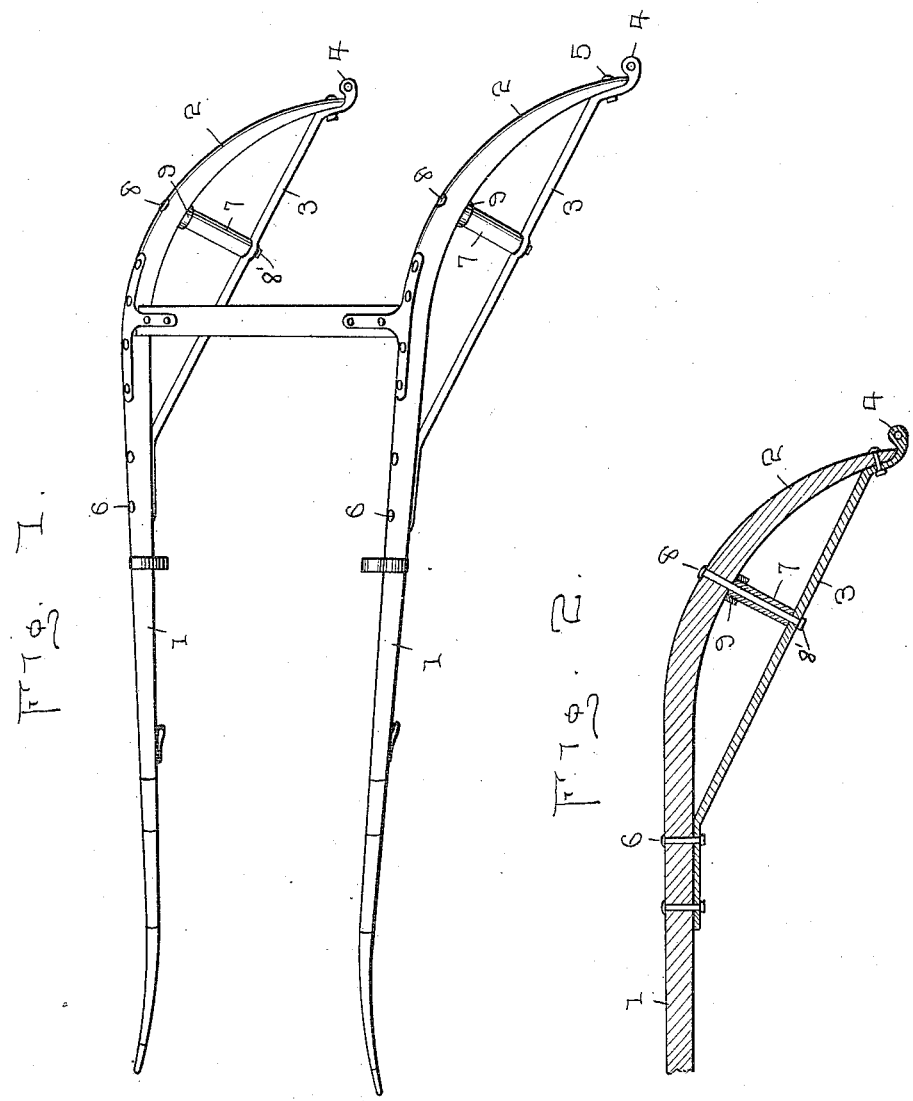
Witnesses
Thos. W. Riley
M. Newcomb
Inventor
J. T. Jones
By W. J. FitzGerald
Attorney

UNITED STATES PATENT OFFICE.

JAMES THOMAS JONES, OF BROOKWOOD, ALABAMA.

SHAFT ATTACHMENT.

1,078,731.  Specification of Letters Patent.  Patented Nov. 18, 1913.

Application filed October 12, 1912. Serial No. 725,470.

*To all whom it may concern:*

Be it known that I, JAMES THOMAS JONES, a citizen of the United States, residing at Brookwood, in the county of Tuscaloosa and State of Alabama, have invented certain new and useful Improvements in Shaft Attachments; and I do hereby declare the following to be a full, clear, and exact description of the invention, such as will enable others skilled in the art to which it appertains to make and use the same.

My invention relates to vehicles and more particularly to shaft construction, and it consists of certain novel features of construction and combination of parts, as will be hereinafter clearly set forth in the following specification and illustrated in the accompanying drawings.

The prime object of my invention is to provide improved means which will render my shaft thoroughly reliable and of enduring character.

A further object of my invention is to provide improved means for at all times keeping the bracing sections or members of my shaft in a taut or non-yielding condition.

Other objects and advantages of my invention will be hereinafter made clearly apparent, reference being had to the accompanying drawings, which are made a part of this application and in which, Figure 1 shows my improved shaft complete, ready for use. Fig. 2 is a longitudinal central sectional view of my shaft, showing my improved bracing bar and adjusting member in section.

Referring in detail to the various parts of my invention and coöperating elements by numerals, 1 indicates a pair of shafts of the usual or any preferred construction having the curved rear ends or bows 2, as is common, and in order to reinforce and strengthen the said bows 2, I provide the bracing rods 3, each having an eye 4 to serve as a coupling with the thills carried by the axle of the vehicle, as is common.

The bracing section 3 is properly bolted to the shaft at its rear end, as by the bolt or rivet member 5, while the forward end thereof is similarly anchored in position, as indicated by the numeral 6. Designed to coöperate with the curved member 2 and the bracing section 3 is the adjustable brace or sleeve 7 which is interposed between the members 3 and the bow of the shaft, as clearly shown in the drawings, and is held in place by the anchoring bolt 8 and nut 8'.

The upper end of the brace 7 constitutes a sleeve which is threaded to receive a suitable internally threaded collar 9 which bears directly against the under side of the curved member 2, and it is obvious therefore, that when any shrinkage occurs and the bracing member 3 becomes slack, all that is necessary is to rotate or partially rotate the adjusting collar 9, whereby in effect, the bracing member 7 will be lengthened, thereby insuring that the bracing rod 3 will be reliably tightened so as to insure against looseness at any portion of its connection with the curved member 8. The collar 9 will therefore, readily take up all slack and prevent incident rattling, and I therefore desire to call particular attention to the importance of the office performed by the bracing member 7. In addition to thus providing against looseness of the parts and constant rattling, it follows that the curved member 2 is very greatly reinforced and strengthened so that the life of the shafts thus constructed, will continue indefinitely and that there can be no possibility of destruction of the curved members 2 without regard to what load or strain may be placed thereon, incident to their use.

It will thus be seen that I have provided reliably efficient means for reinforcing and strengthening a pair of shafts or tongues of a vehicle without materially increasing the weight thereof and that I have also provided efficient means for readily taking up all shrinkage or looseness of the parts to obviate rattling and consequent undue wear, and, believing that the advantages, construction and use of my invention have thus been made clearly apparent, further description is deemed unnecessary.

What I claim and desire to secure by Letters Patent is:—

In combination with a vehicle shaft having a bow and a brace spanning the bow, of a bolt extending through the brace and through the bow and having a nut thereon, an externally threaded sleeve around the bolt, and an internally threaded collar fitted on the sleeve, said collar being in contact with the bow, and said sleeve being in contact with the brace, so that the collar may be rotated upon the sleeve for increasing the distance between the medial portion of the bow and the medial portion of the brace when the nut is loosened, substantially as described and shown.

In testimony whereof I have signed my name to this specification in the presence of two subscribing witnesses.

JAMES THOMAS JONES.

Witnesses:
W. J. SQUIRES,
A. FAIRLESS.